United States Patent [19]
Rodriquez, Jr.

[11] Patent Number: 5,876,105
[45] Date of Patent: Mar. 2, 1999

[54] NOTEBOOK SIZE LCD PROJECTOR

[75] Inventor: Ernesto M. Rodriquez, Jr., Round Rock, Tex.

[73] Assignee: Minnesota Mining and Manufacturing Company, Saint Paul, Minn.

[21] Appl. No.: 858,478

[22] Filed: May 16, 1997

Related U.S. Application Data

[63] Continuation-in-part of Ser. No. 623,729, Mar. 29, 1996, abandoned.

[51] Int. Cl.$^6$ .................................................... G03B 21/14
[52] U.S. Cl. ............................................. 353/119; 353/52
[58] Field of Search ................................. 353/119, 122, 353/102, 52

[56] References Cited

U.S. PATENT DOCUMENTS

| | | | |
|---|---|---|---|
| 4,925,295 | 5/1990 | Ogawa et al. | 353/57 |
| 4,969,733 | 11/1990 | Jewison | 353/119 |
| 5,313,234 | 5/1994 | Edmonson et al. | 353/57 |
| 5,639,152 | 6/1997 | Nelson | 353/119 |
| 5,651,599 | 7/1997 | Fujimori et al. | 353/119 |
| 5,669,688 | 9/1997 | Baar et al. | 353/119 |
| 5,676,442 | 10/1997 | Fujimori | 353/119 |
| 5,692,821 | 12/1997 | Rodriquez, Jr. et al. | 353/52 |
| 5,743,614 | 4/1998 | Salerno et al. | 353/122 |

FOREIGN PATENT DOCUMENTS

| | | |
|---|---|---|
| 0 658 800 A1 | 12/1994 | European Pat. Off. . |
| 3622472 A1 | 1/1988 | Germany . |
| 42 30 896 C1 | 3/1994 | Germany . |
| 63-144336 | 6/1988 | Japan . |
| 2003085 | 1/1990 | Japan . |
| WEO 95/29427 | 11/1995 | WIPO . |

*Primary Examiner*—William Dowling
*Attorney, Agent, or Firm*—Matthew B. McNutt

[57] ABSTRACT

A compact electronic projector has separate optics and electronics compartments which are thermally and electromagnetically isolated from each other. In this manner closely spaced components are prevented from electrically or thermally interfering with each other, and high quality projected images can be maintained. The optics compartment contains a display assembly, such as a liquid crystal display panel and associated Fresnel lenses, which is mounted inside the projector so as to rotate between a storage position in which the display assembly is generally parallel with the projection axis of the device, and an operational position in which the display assembly is disposed at an oblique angle with relative to the projection axis. The assembly can thus be rotated to occupy the voids needed for expansion and contraction of the optical beams when the projector is in use, but which have no useful function when the projector is not in use.

18 Claims, 7 Drawing Sheets

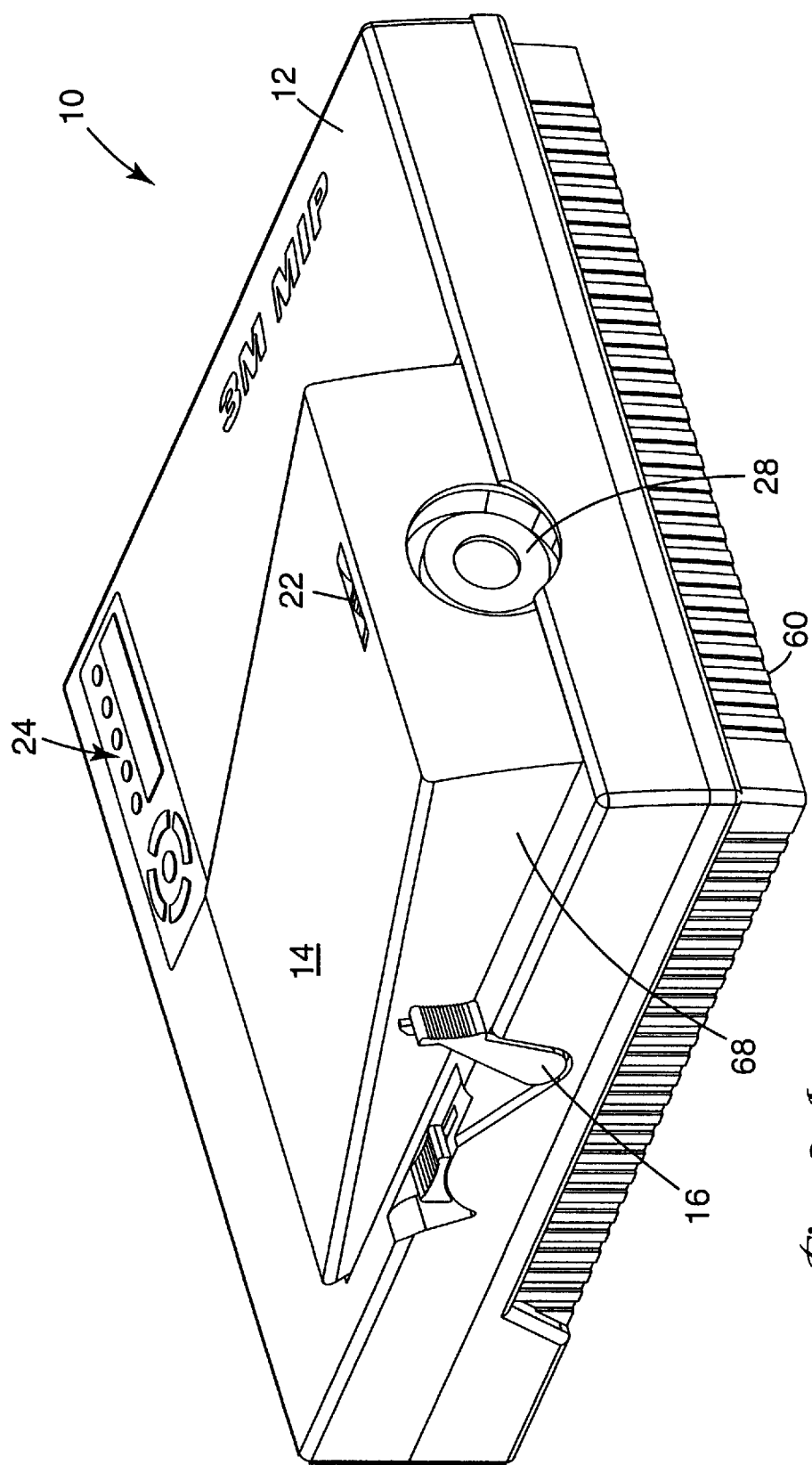

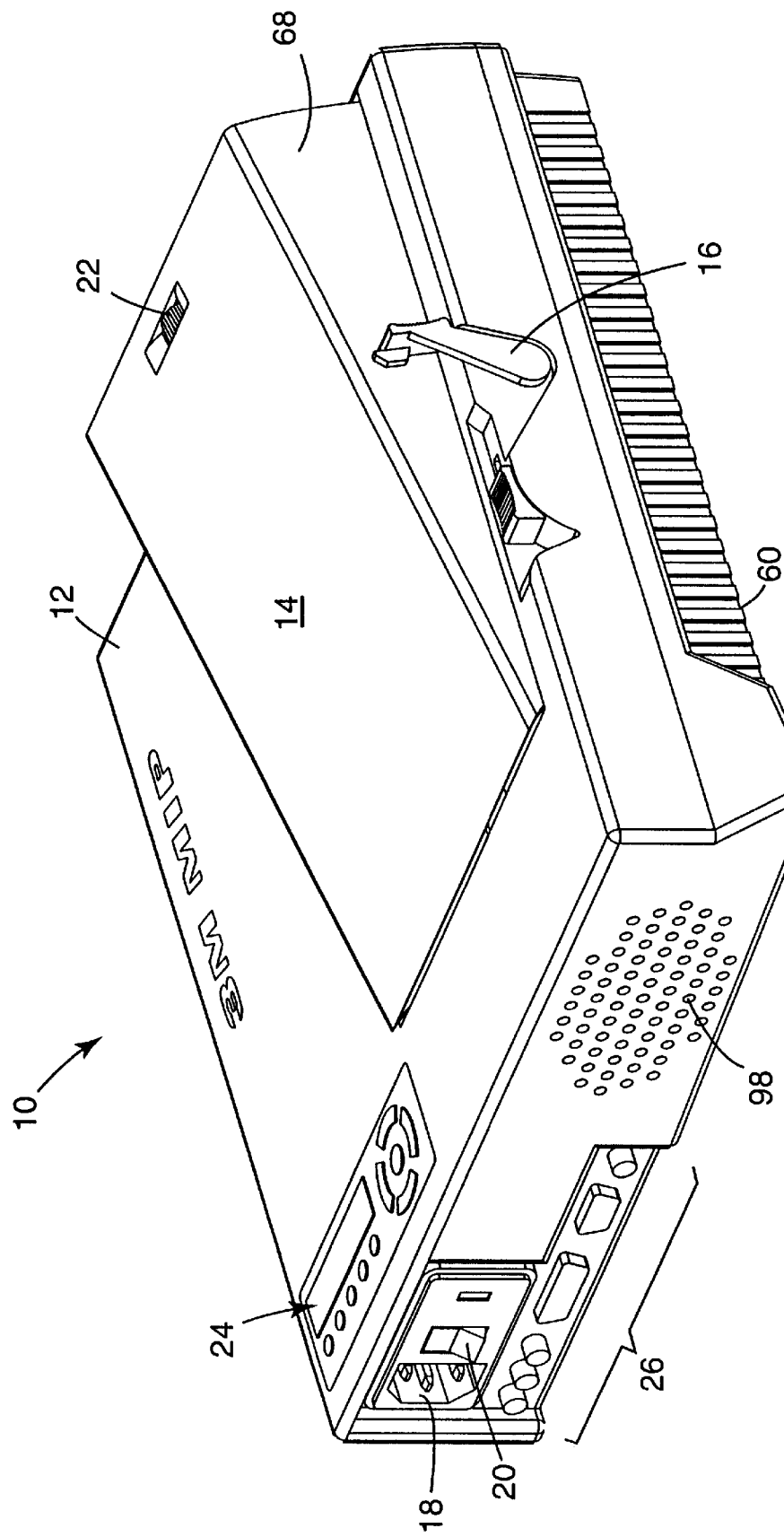

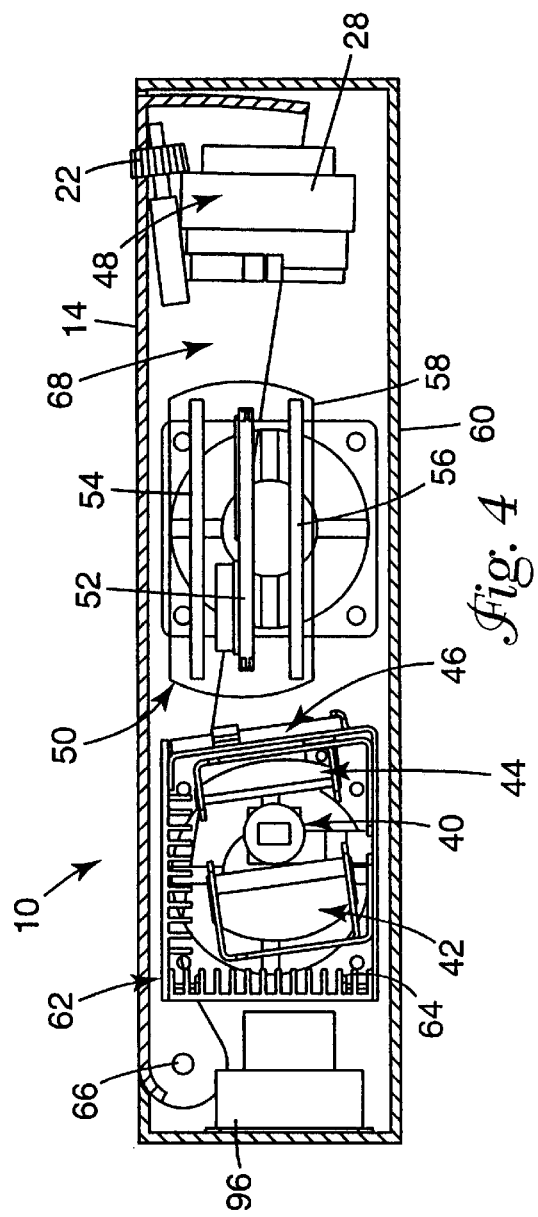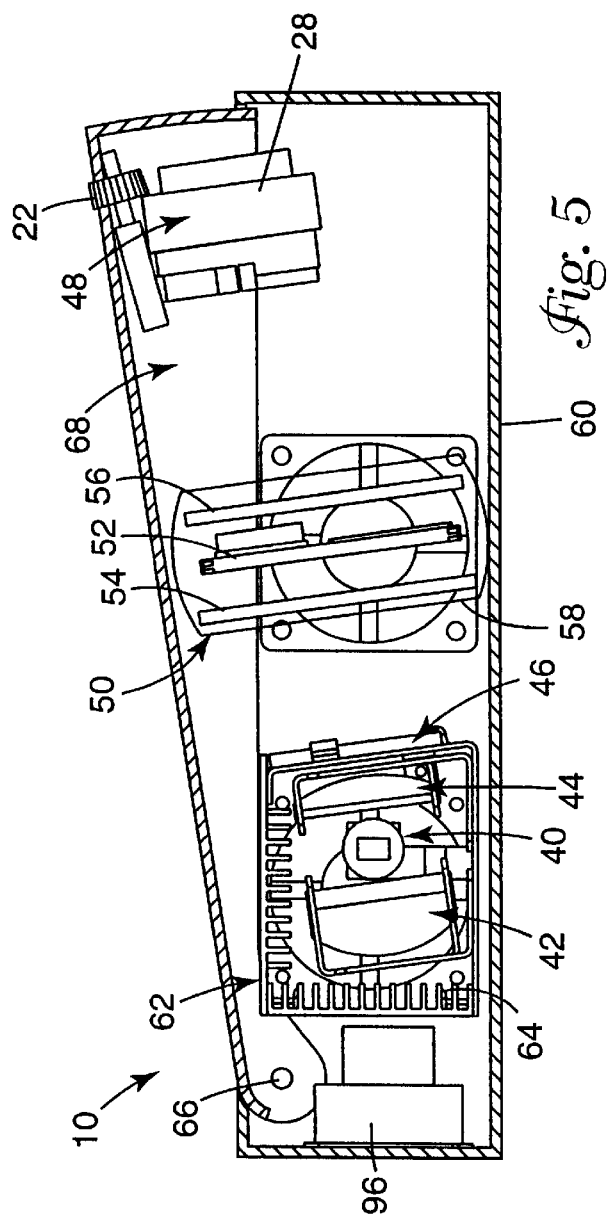

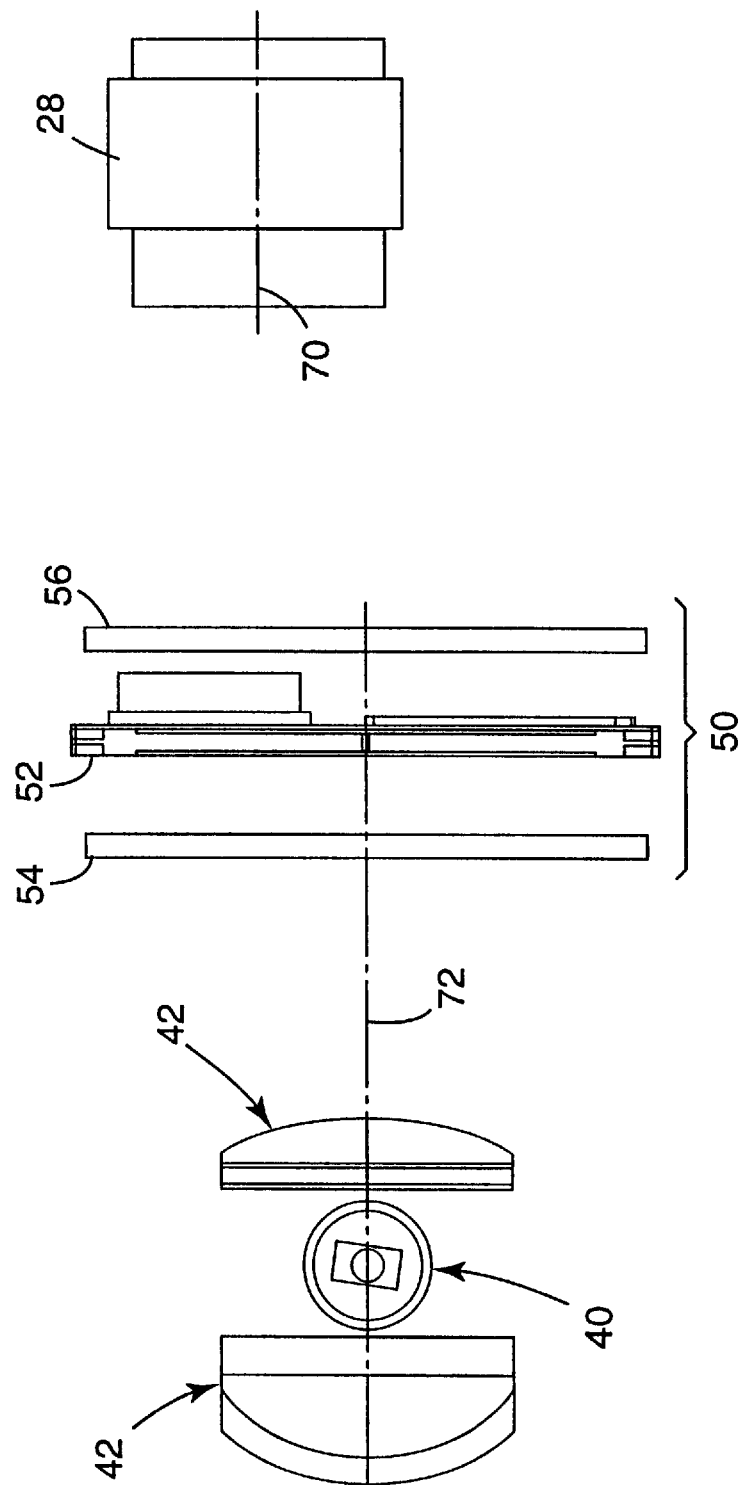

NOTEBOOK SIZE LCD PROJECTOR

This application is a Continuation-in-Part of application Ser. No. 08/623,729, filed Mar. 29, 1996, now abandoned.

FIELD OF THE INVENTION

The present invention relates to projection systems, particularly to a compact and portable projector having an electronically addressable display, such as a liquid crystal display (LCD)

BACKGROUND OF THE INVENTION

The introduction of portable computing devices such as laptop computers and the development of sophisticated presentation software for use on computers has resulted in a need for similarly compact and portable projection devices for use in what is commonly known as an electronic presentation. One early and still common manner of projecting an electronic presentation has been the use of a liquid crystal display (LCD) panel, such as illustrated in U.S. Pat. No. 4,719,547, on a conventional overhead projector (OHP). These panels are electronically addressable, i.e., the appearance of the final image is controlled by electronic signals sent to the panel. The electronic signals may come from a computer, or may be standard video (NTSC) signals, or from other suitable devices.

The use of such a LCD panel is illustrated in U.S. Pat. Nos. 5,231,434 and 4,846,694. The LCD panel and the overhead projector are independent devices used together for the duration of the presentation only. The LCD panel is placed on the overhead projector stage, and light passing from the stage through the LCD panel is projected onto a viewing surface by the overhead projector.

As the convenience of electronically generated and stored presentations has become appreciated, a new class of presentation devices has appeared, often referred to as "integrated projectors." An integrated projector unit is capable of taking input from a computer or other signal source and projecting an image onto a screen. Modern integrated projectors are capable of projecting useful images even in high ambient light conditions. Such units have developed a patent literature of their own, a few examples of which are outlined below.

U.S. Pat. No. 4,943,154 shows a projector that has three "light valves" (a particular form of an addressable liquid crystal display), and a complicated optical path intended to allow the output of a white-light source to be split into red, green and blue components, imaged with the three light valves (one for each color) and then recombined for projection through a single lens. Such optical systems are complicated to manufacture, assemble and maintain, occupy a considerable amount of space, weigh a substantial amount, and have potential efficiency problems. Other examples of this type of device are illustrated in U.S. Pat. Nos. 5,374,968 and 4,018,509.

An alternative method of projecting an image is to have a single LCD panel, optical path, and lens, and interpose in succession red, green and blue filters. As each filter moves into the optical path, the appropriate color image is formed on the LCD. Such units have been limited by the ability of the LCD to rapidly respond to changing input signals. They also need a well engineered filter wheel and associated hardware. For these reasons this method has found little use.

It is also possible to use what is known as a three-color LCD. This panel has an array of micro-filters (red, green and blue) printed onto the face of the display, and these filters are addressed appropriately by the liquid crystal array mounted to register with them. This type of LCD, while slightly more complicated to manufacture, has the advantage of needing only a single optical system. In addition, the filters and control elements can never lose alignment, and the weight of the LCD need be little more than the weight of a single color unit, thus economizing on weight and space. Additional weight savings are also achieved in the elimination of prisms, filters, mirrors, etc., and their mounts.

U.S. Pat. No. 5,321,450 describes a projector exemplifying these principles. By the use of mirrors and an angled LCD, a low profile is achieved. A lens having its optical axis vertically disposed is used for projection, and a final mirror (that can be folded down) redirects the light along a horizontal path. This mirror is the only component that is moved for storage, and the space savings is minor. Another such device is illustrated in U.S. Pat. No. 4,971,436 which shows a light source, a transmission LCD panel and a projection lens. Also illustrated in this patent are folded optics which are desirable to reduce the total volume or footprint of the unit.

There are limitations to further size reduction in these devices. As requirements for high brightness projectors evolve, more powerful light sources must be incorporated. When powerful sources are to be incorporated into small-sized devices, problems arise over the removal of waste heat (generated by most light sources, and particularly by Tungsten filament, quartzhalogen and arc sources). Thus, efficient heat removal systems must be designed. Also, there is a very substantial danger that the heat generated by the light source will cause a degradation of the performance of sensitive electronic components needed for the operation of these devices. U.S. Pat. No. 5,313,234 addresses this problem by having designed "hot" and "cold" compartments. The lamp source and cooling means are contained in the "hot" compartment, while the LCD panel and the projection lens are contained in the "cold" compartment.

Related and co-pending applications U.S. Ser. No. 08/673,292, U.S. Ser. No. 08/623,729 and U.S. Ser. No. 08/787,075, owned by the assignee of the present application, disclose further ways to reduce the size of such projectors. U.S. Ser. No. 08/673,292 discloses an efficient lamp cooling means that permits the placement of LCD panels in close proximity to powerful light sources. U.S. Ser. No. 08/623,729 and U.S. Ser. No. 08/787,075 disclose means for rotating the LCD between a storage position and an operative position, thereby reducing the storage volume of the projector. It is possible, by these means, to produce conveniently sized projectors which are easily portable and still capable of excellent optical performance.

However, as the size of integrated projectors decreases, new problems arise. In particular, the close proximity of sensitive electronic components and powerful light sources provides the opportunity for undesired electromagnetic and thermal interactions to occur between the components. These interactions are capable of degrading the performance of the projector system to such an extent that it is unacceptable for high quality presentations.

It would therefore be desirable and advantageous to devise a compact and portable integrated projector which took advantage of unused space within the projector, which minimized electromagnetic and thermal interference between components, and which allows for quick and easy deployment for use.

SUMMARY OF THE INVENTION

The present invention provides a compact integrated projector for electronic presentations. The projector generally comprises a housing with an optics compartment and an electronics compartment within the housing, wherein the optics compartment and the electronics compartment are electrically and thermally shielded from each other. In this manner, electromagnetic and thermal interference between the optics and the electronics of the projector is avoided. The optics compartment contains an optics assembly for creating and projecting an image, where the optics assembly generally includes a light source, a display assembly having means for creating an image, means for directing light from the light source to the display assembly, and a projection lens positioned to receive the image created by the display assembly. The display assembly may take the form of a transmissive liquid crystal display panel. The electronics compartment contains an electrical assembly for operating the light source and display assembly.

The projector has a storage/transportation configuration and an operative configuration. The display assembly is correspondingly movable between a storage position and an operative position. The display panel is generally parallel with the projection axis when in a storage position, and normal to the projection axis when in an operative position. When the display panel is in an operative position, a door of the optics compartment opens to expose the projection lens, such that the projection lens is positioned at an inclined angle relative to the projector's support surface.

The invention provides a projector that can be addressed electronically and that is capable of providing excellent image quality and brightness. The projector can be easily reconfigured for compact storage and easy transportation.

BRIEF DESCRIPTION OF THE DRAWINGS

FIGS. 2A and 2B are perspective views of the preferred embodiment of the projector in an operational configuration.

FIG. 4 is an elevational view of the projector in a storage/transportation configuration taken along line 4—4 in FIG. 3.

FIG. 5 is an elevational view of the projector of FIG. 4 in an operational configuration.

FIG. 6 is an enlarged and isolated view of the optical assembly of the projector in an operational configuration.

DETAILED DESCRIPTION OF THE INVENTION

Figure 1A:
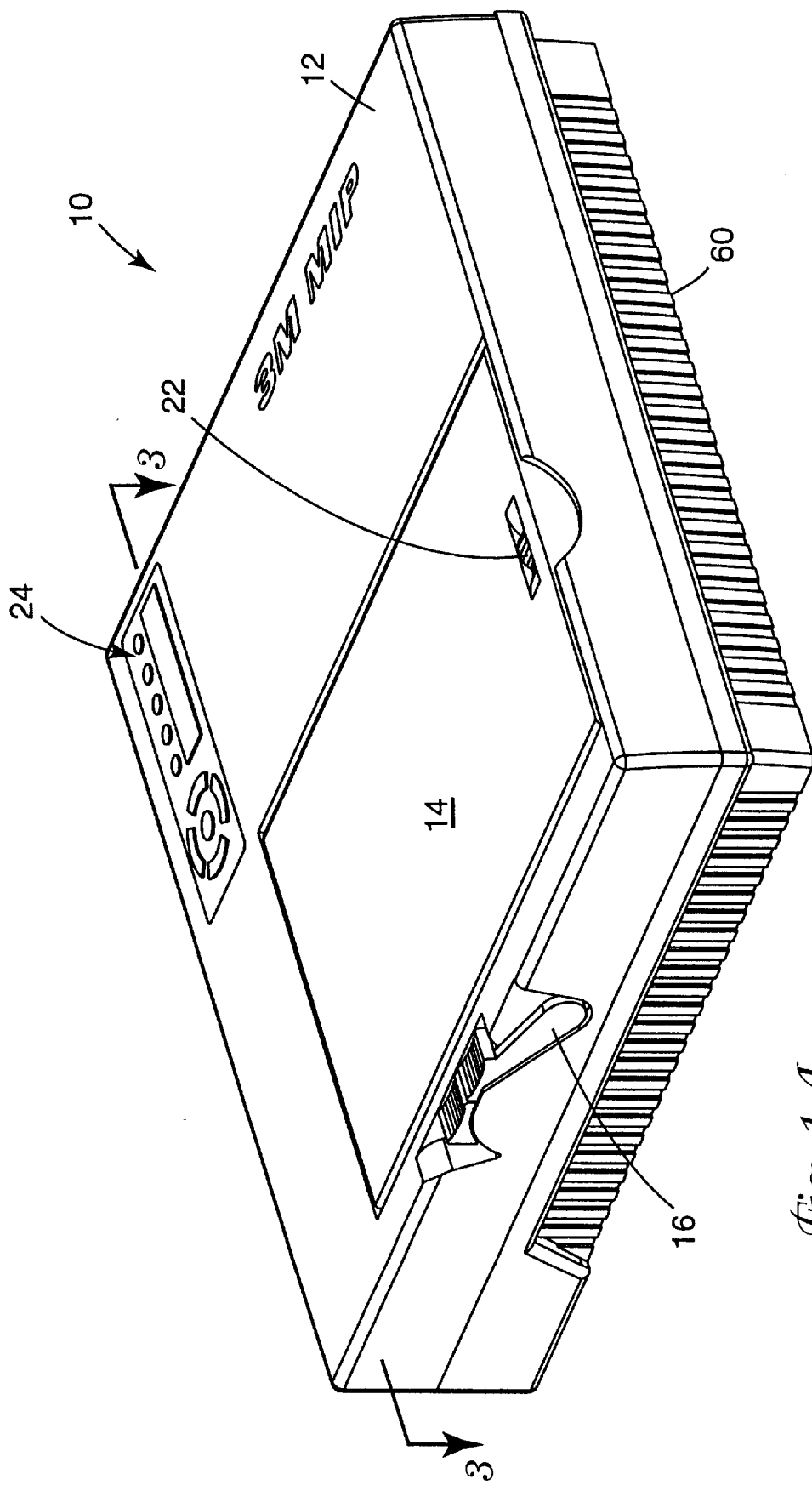
FIGS. 1A and 1B are perspective views of the preferred embodiment of the projector in a storage/transportation configuration.
Figure 1B:
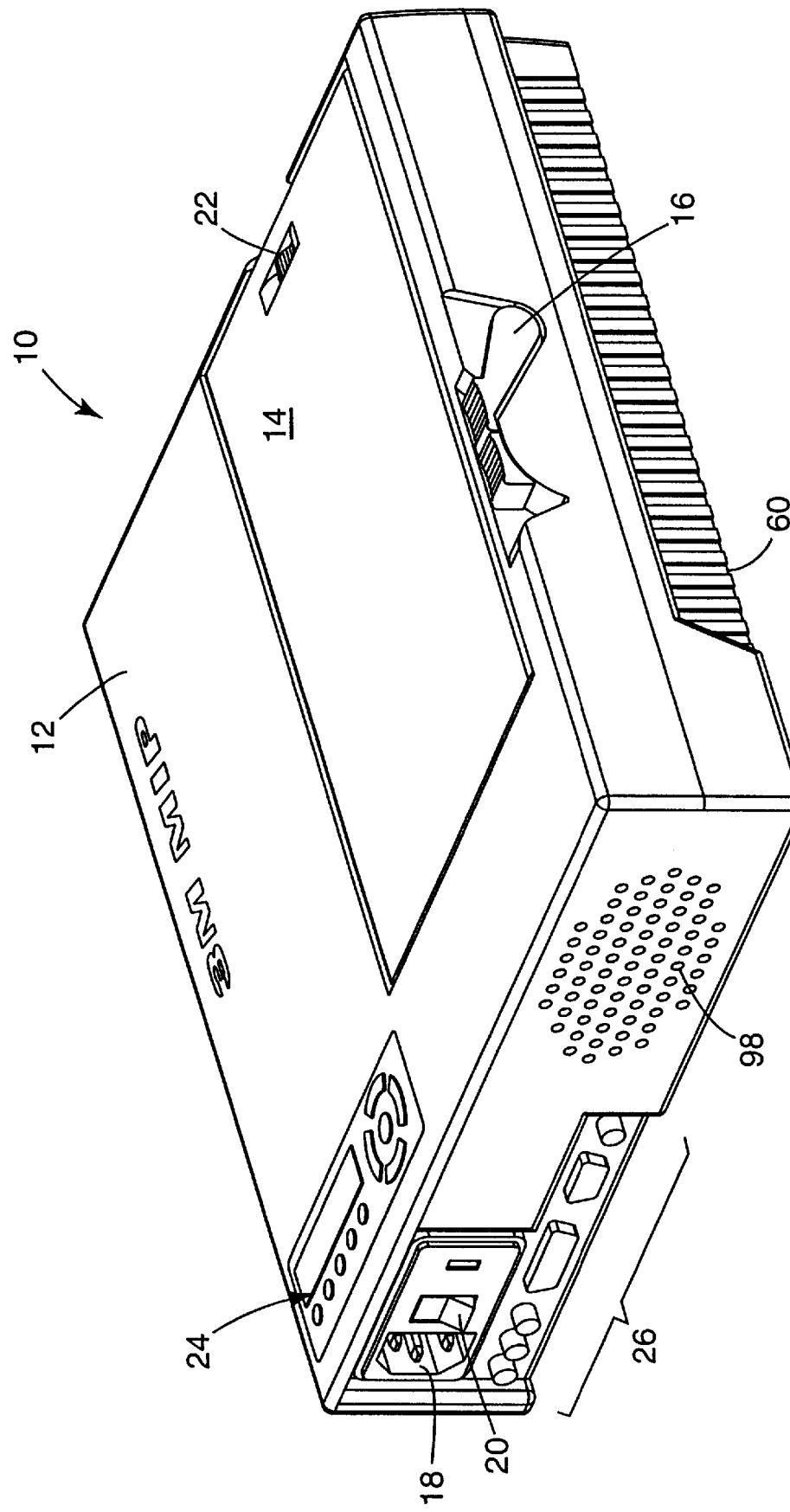

A preferred embodiment of the compact projector 10 is seen in FIGS. 1A, 1B, 2A and 2B. FIGS. 1A and 1B show the preferred embodiment of projector 10 in its closed or storage configuration, while FIGS. 2A and 2B show projector 10 in its open or operative configuration. Projector 10 includes a case or body 12, a retracting door 14, an actuation lever or button 16 for operating door 14, a receptacle 18 for a power supply cable (not shown), a power (on/of) switch 20, a focus adjustment wheel 22, a control panel 24, and one or more ports providing various types of electrical connectivity (such as video and data drivers), each indicated as 26. To change projector 10 from its storage configuration (FIGS. 1A and 1B) to its operational configuration (FIGS. 2A and 2B), lever 16 is actuated to raise door 14 and reveal projection lens 28. In this embodiment, body 12 is box-like, and its upper surface (which includes retracting door 14) is planar and generally parallel with its lower, planar surface when projector 10 is in the storage configuration shown in FIGS. 1A and 1B. This shape provides a particularly low profile, but those skilled in the art will appreciate that other profiles can be provided which are not as rectangular as projector 10. Body 12 may be constructed of any durable material, preferably a lightweight polymer such as acrylonitrile butadiene styrene (ABS) or polycarbonate.

Figure 3:
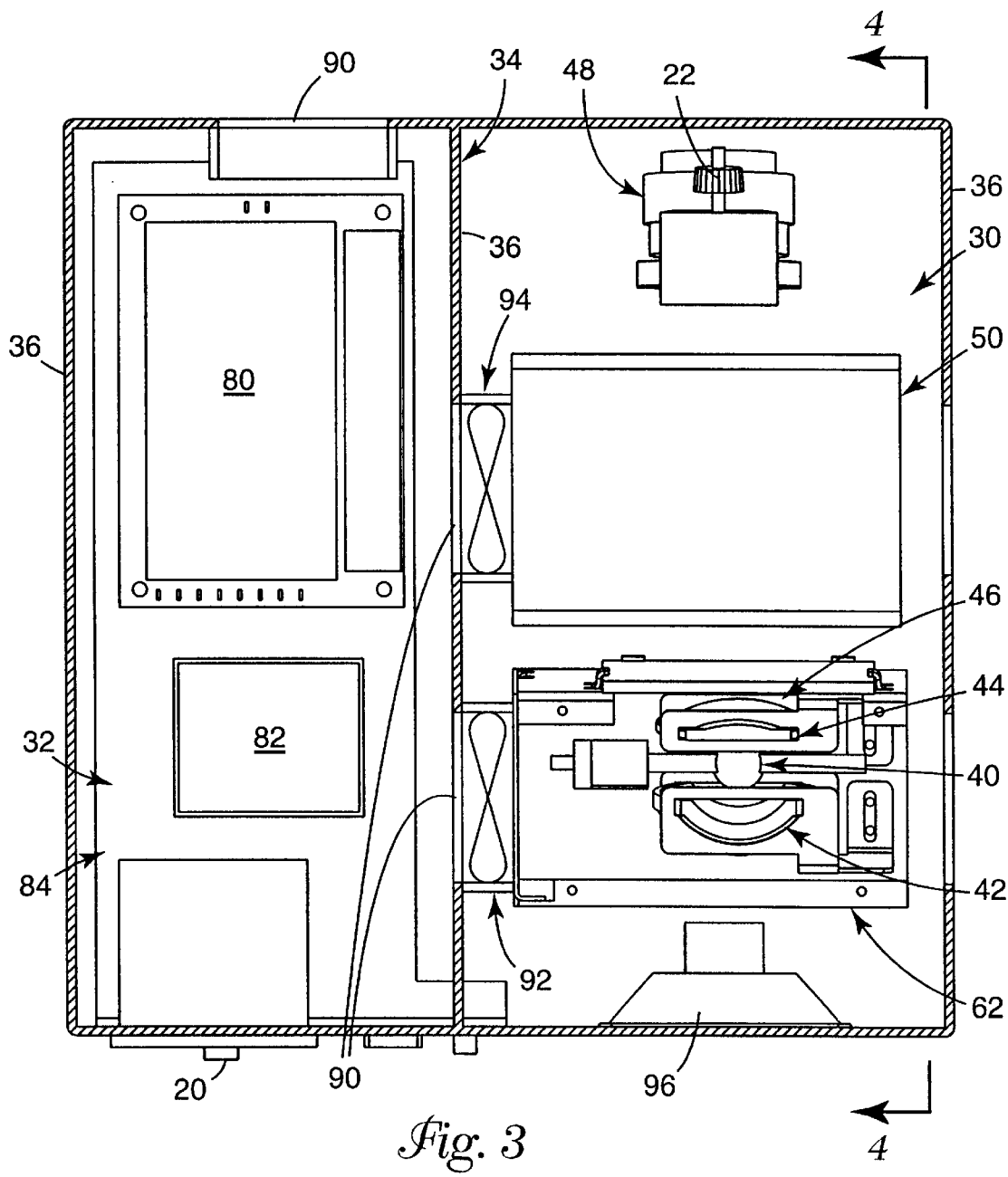
FIG. 3 is a plan view of the projector of FIGS. 1A and 1B, taken in the direction of line 3—3 in FIG. 1A.

FIG. 3 is a plan view of projector 10 taken in the direction of lines 3—3 in FIG. 1A, depicting projector 10 in its storage/transportation configuration. FIG. 3 shows that the interior of projector 10 is divided into two compartments: an optics compartment 30 and an electronics compartment 32. Optics compartment 30 and electronics compartment 32 are physically separated by wall 34 and are also thermally and electromagnetically shielded from each other by electromagnetic shielding material 36, such as conductive elastomer gaskets made by Chomerics. Such electromagnetic shielding material 36 will typically extend over all sides of compartments 30, 32, as well as the top and bottom portions of compartments 30, 32. The electromagnetic shielding need not, however, surround both optics compartment 30 and electronics compartment 32. So long as compartments 30, 32 are shielded from each other, electromagnetic shielding could surround only one of compartments 30, 32. If substantial interference is expected from other devices in the vicinity of projector 10, it may be desirable to have both compartments 30, 32 shielded, as illustrated in the figures. It is, of course, not possible to completely thermally and electromagnetically isolate compartments 30, 32. Accordingly, the degree of shielding between compartments 30, 32 need only be sufficient to prevent any degradation of the performance of projector 10.

Within optics compartment 30, projector 10 is additionally comprised of a light source 40, a collimator (parabolic reflector) 42 and condenser lens 44 oppositely disposed about light source 40, an infrared filter (hot mirror) 46 proximate condenser lens 44, a display assembly 50, and previously mentioned projection lens 28. Projection lens 28 is adjusted with focus adjustment wheel 22 and focusing mechanism 48. All of these components are located in optics compartment 30 of body 12 although, as described below, display assembly 50 and projection lens 28 protrude above the upper surface of body 12 when projector 10 is in its operational configuration.

Light source 40 is preferably a high-intensity source such as an EVD (halogen) lamp or a series of high-output metal halide lamps (e.g., 250 watt, 400 watt, 575 watt) available from Osram (part of Sylvania Co. of Germany) or Philips Electronics of the Netherlands. It is connected to a 12 volt DC power supply located in electronics compartment 32 of body 12. Other suitable light sources, such a reflectorized lamp could also be used if so desired. Condenser lens 44 is preferably piano-convex and constructed of a borosilicate glass such as Pyrex (a trademark of Corning, Inc.). Infrared filter 46 is a conventional hot mirror such as those available from Bausch & Lomb.

Display assembly 50 can take on various forms, such as a transmissive LCD panel, a light valve, or a micromirror array. In the preferred embodiment of projector 10, display assembly 50 includes an LCD panel 52 such as the 6.4" (16.3 cm) panel (or smaller scale) available from Sharp of Japan, and two Fresnel lenses 54 and 56, secured in a housing 58.

Display assembly 50 is pivotally or rotatably attached to the inside of body 12 in such a manner that, in the operational state, display assembly 50 is generally perpendicular to the light path, but in the storage state it is generally parallel to the light path and occupies the space that is reserved for the light cone (the voids needed for expansion and contraction of the optical beams when the projector is in use) during operation. These voids have no useful function when the projector is not in operation, and are thus available for component storage. Such a feature enables saving a substantial volume of space, making the closed unit compact and easily transported.

Those skilled in the art will recognize that a variety of mechanisms will function to move display assembly 50 from a storage position to an operational position. For example, display assembly 50 does not have to be rotatably mounted, e.g., a linkage of bars could be used to move display assembly 50 from its storage position to its operational position. Those skilled in the art will also recognize that if display assembly 50 is sufficiently small (or body 12 sufficiently large), it would be possible to mount display assembly 50 in a fixed position, such that no movement of display assembly 50 between a storage position and an operational position as described above is necessary. Such a "fixed" mounting of display assembly 50 is contemplated to be within the scope of the this application, as such a configuration would still benefit from the present invention.

In referring to the Figures, the term "light path" is used to describe a direction of the projector which coincides with the projection axis, i.e., the generally straight line between light source 40 and projection lens 28. This term is appropriate for the particular embodiment depicted, but should not be construed in a limiting sense. Other embodiments may employ folded optical paths such as by the use of mirrors, catadioptic Fresnel lenses, etc., and (while these components might add to the cost of the device and be less desirable for other reasons) such a device could still benefit from the present invention.

Also, while it is certainly preferable to have the light striking the LCD panel at a generally normal angle during use, this is not a critical requirement. If the light strikes display panel 50 at an oblique but non-orthogonal angle, the shape of the image can be corrected through selection of the angle of rotation of the display panel.

The placement of all of the optical components into a single compartment provides significant advantages to projector 10. Primarily, the optical components are in a moveable but rigidly aligned relationship, such that the spatial orientation between the optical components does not vary when the user changes projector 10 from the storage/transportation configuration to the operational configuration. The fixed spatial orientation ensures that the quality of the projected image is maintained at a high level. The advantages of projector 10 can easily be seen in the transition of projector 10 from its storage/transportation configuration to its operational configuration, as described below.

FIG. 4 shows a side view of the optical components in optics compartment 30 corresponding to the plan view of FIG. 3. Projector 10 is in its storage/transportation configuration, and the plane of display assembly 50 is in generally parallel alignment with the light path between light source 40 and projection lens 28. Light source 40 and associated collimator 42, condenser lens 44 and infrared filter 46 are fixedly oriented at an inclined angle relative to the flat bottom 60 of body 12. Duct 62 which surrounds light source 40 can be seen, as can heat sink elements 64 which aid the cooling of light source 40. Thermal management of the light source is described in co-pending and co-owned U.S. patent application Ser. No. 08/673,292, which is incorporated by reference. Door 14 is hinged to body 12 at hinge 66, and movable optics compartment walls 68 (which operate as a part of door 14) can also be seen. Moveable optics compartment walls 68 are provided to prevent light leakage from the interior of optical compartment 30 when projector 10 is placed in its operational configuration. Projection lens 28, focusing mechanism 48, and focus adjustment wheel 22 are fixedly attached to the interior of door 14 and move together with door 14.

As best seen in FIG. 5, when lever 16 is actuated by a user, display assembly 50 is rotated such that the light path is approximately orthogonal to the plane of display assembly 50. As display assembly 50 rotates into its operational position, door 14, projection lens 28 and focusing mechanism 48 are moved to a preset raised position, such that projection lens 28 is generally aligned with the inclined angle of light source 40. Projector 10 is then ready for use.

When use of projector 10 is completed, the user may change projector 10 back to its storage/transportation configuration by simply rotating display assembly back to its storage position. Door 14 is preferably spring-loaded so as to automatically retract upon rotation of display assembly 50 to the storage position.

It should be noted that the plane of display assembly 50 may deviate from a orthogonal orientation with respect to the light path intentionally, for example to correct the optical effect known as "keystoning". Keystoning is an image distortion observed when the object plane of an optical system, in this case LCD panel 52, and the projection screen (not shown) are not parallel. Keystoning is observed as a difference in the dimensions of the upper and lower bounds of the projected image, whereas in the object to be projected the dimensions are identical or very close. FIG. 6 shows an enlarged side view of the optical components disposed in the operational configuration. An optic axis 70 of projection lens 28 is shown, as is axis 72 joining light source 40 with the center of the LCD panel 52. It should be noted that optic axis 70 and axis 72 are not co-linear. The purpose of the non-linearity is to reduce the keystoning effect of the projected image.

Electronics compartment 32 contains such components as the power supply 80, the striker 82 for the arc light source 40, electronic circuit board 84, and electronic data port connections 26. Naturally, depending upon the desired functions of projector 10, numerous other component variations and dispositions will be apparent to those skilled in the art. In general, it is desirable to place electronic components which are adversely affected by excessive thermal or electromagnetic interference in electronics compartment 32.

Access between the exterior of projector 10 and compartments 30, 32 and between compartments 30 and 32 is needed for the flow of cooling air. For this reason, access ports 90 are provided in body 12 and wall 34. Access ports 90 are preferably covered by filters (not shown) which have the ability to remove air-borne particulates and also have electromagnetic shielding properties. Such filters are available from, for example, Tetko Inc. of New York and Delker Corporation.

To aid the flow of cooling air through compartments 30, 32, light source 40 is contained in duct housing 62 which serves to draw air through optics compartment 30 by means of a fan 92, duct housing 62 being designed to vent the heated air to the exterior of body 12. As shown in FIG. 3, one or more auxiliary fans 94 may also be provided to draw cooling air through compartments 30, 32 of projector 10, for example to cool display assembly 50. In the preferred embodiment, fans 92, 94 draw air from the exterior of body 12 into electronics compartment 32, and then into optics compartment 30. This circulation of cooling air brings the coolest (exterior) air first over the heat sensitive electronics component, and then into the warmer optics compartment, such that the most efficient cooling of each compartment is achieved. Of course, other air flow pattern may be devised which also provide adequate cooling of projector 10.

Additional features of projector 10 are seen in FIG. 3. In particular, projector 10 may also be equipped for the audio portion of audio-visual electronic presentations. For this purpose, projector 10 is provided with a loudspeaker 96. Loudspeaker 96 is shown mounted on the rear panel of body 12 within optics compartment 30, such that sound generated by loudspeaker 96 exits perforations 98 in body 12 toward the viewing audience, which is typically seated behind projector 10. However, loudspeaker 96 could also be located in electronics compartment 30, or could be eliminated from projector 10 entirely. Projector 12 could also be equipped with data ports 26 suitable for connection to external speakers.

Projector 10 has a number of advantages besides compactness and ease of transportation. The simplicity of the optical components produces a lightweight projector, further enhancing portability. Due to the reduction in size, weight and number of components, a unit can be produced at a relatively low cost without sacrificing performance. The projector can be addressed electronically and is capable of providing excellent image quality and brightness. For storage, the primary advantages are reduction of total volume of the unit and the absence of protruding parts that could otherwise be damaged. The embodiment of projector 10 described above has a volume in the range of 200 to 300 cubic inches and preferably has dimensions of approximately 2.5 inches×9 inches×10 inches for a volume of less than 250 cubic inches. The size of the unit can be further reduced as smaller LCD panels are introduced. A carrying handle (not shown) could also be attached to the unit to easily transport it using only one hand. Since the unit is engineered to have a relatively smooth exterior, it suffers less damage if accidentally brought into forceful contact with other objects, and it is less likely to interfere with the movement of the person transporting the unit. Finally, the automatic deployment mechanism permits the user to quickly set up for a presentation, thus enhancing the effectiveness of the unit.

Although this invention has been described with reference to specific embodiments, this description is not to be construe in a limiting sense. Modifications and alterations of the disclosed embodiment will be apparent to persons skilled in the art upon reference to the description of the invention. It is contemplated that such modifications can be made without departing from the spirit or scope of the present invention as defined in the claims.

What is claimed is:

1. A display device comprising:
   a housing;
   an optics compartment within the housing, the optics compartment containing an optics assembly for creating and projecting an image, wherein the optics assembly comprises:
      a light source;
      a display assembly having means for creating an image;
      means for directing light from the light source to the display assembly, defining a light beam direction; and
      a projection lens positioned to receive the image created by the display assembly; and
   an electronics compartment within the housing, the electronics compartment containing an electrical assembly for operating the optics assembly;
   wherein the optics compartment and the electronics compartment are electrically and thermally shielded from each other.

2. A display device comprising:
   a housing;
   an optics compartment within the housing, the optics compartment containing an optics assembly for creating and projecting an image;
   an electronics compartment within the housing, the electronics compartment containing an electrical assembly for operating the optics assembly; and
   a loudspeaker;
   wherein the optics compartment and the electronics compartment are electrically and thermally shielded from each other.

3. The display device of claim 1, wherein the electrical assembly includes an electronic circuit board for operating the display assembly and light source.

4. The display device of claim 1, wherein the display assembly is adapted to move from a storage position in which the display assembly is generally parallel with the light beam direction, to an operative position in which the display assembly is disposed at an oblique angle with respect to the light beam direction.

5. The display device of claim 1, wherein the optics compartment is adapted to move from a storage position to an operative position.

6. The display device of claim 1, wherein the means for directing light from the light source to the display assembly includes:
   a reflector positioned adjacent the light source, opposite the display assembly; and
   a condenser lens interposed between the sight source and the display assembly.

7. The display device of claim 1, wherein the display assembly includes a liquid crystal display panel.

8. The display device of claim 4, wherein the display assembly is adapted to rotate from a storage position to an operative position.

9. The display device of claim 4, wherein the oblique angle is approximately 90°.

10. The display device of claim 5, wherein the optics compartment includes a door movable between a storage position and an operative position, and wherein the projection lens is concealed when the door is in a storage position and exposed when the door is in an operative position.

11. The display device of claim 1, wherein the housing has a volume of less than 300 cubic inches.

12. The display device of claim 1, wherein the housing has a volume of less than 250 cubic inches.

13. An LCD projector comprising:
   a housing having a flat lower surface and an upper surface generally parallel to the lower surface;
   an optics compartment within the housing containing a light source, a display assembly having means for creating an image, means for directing light from the light source to the display assembly, the means for directing light defining a light beam direction, and a projection lens positioned to receive the image created by the display assembly;
   an electronics compartment within the housing containing an electronics assembly for operating the light source and display assembly, the electronics compartment electromagnetically and thermally insulated from the optics compartment; and
   a door within the upper surface of the housing, the door continuous with the optics compartment and moveable between a storage position in which the door is flush with the upper surface of the housing, and an operative position in which the door extends above the upper surface of the housing to expose the projection lens.

14. The LCD projector of claim 13, wherein the display assembly is adapted to move from a storage position in which the display assembly is generally parallel with the light beam direction, to an operative position in which the display assembly is disposed at an oblique angle with respect to the light beam direction.

15. The LCD projector of claim 14, wherein the means for directing light from the light source to the display assembly includes:

a reflector positioned adjacent the light source, opposite the display assembly; and a condenser lens interposed between the light source and the display assembly.

16. The LCD projector of claim 13, wherein a line between the light source and the projection lens defines a projection axis, and wherein when the door is in an operative position a pitch angle of the projection axis is inclined above the plane of the housing upper surface.

17. The LCD projector of claim 16, wherein when the door is in a storage position, the pitch angle of the projection axis is below the plane of the housing upper surface.

18. The LCD projector of claim 13, wherein the housing has a volume of less than 300 cubic inches.

* * * * *